(12) United States Patent
Shimono et al.

(10) Patent No.: US 10,309,643 B2
(45) Date of Patent: Jun. 4, 2019

(54) STRUCTURE FOR SEISMIC ISOLATION, STEEL SUPPORT STRUCTURE, AND METHOD FOR SEISMIC ISOLATION OF EXISTING STEEL SUPPORT STRUCTURES

(71) Applicant: Mitsubishi Hitachi Power Systems, Ltd., Yokohama-shi, Kanagawa (JP)

(72) Inventors: Masaki Shimono, Tokyo (JP); Kunihiro Morishita, Tokyo (JP); Motoki Kato, Tokyo (JP); Yuji Kuroda, Yokohama (JP); Tatsuya Amano, Yokohama (JP); Keiichi Moritsuka, Yokohama (JP)

(73) Assignee: MITSUBISHI HITACHI POWER SYSTEMS, LTD., Yokohama-shi (JP)

( * ) Notice: Subject to any disclaimer, the term of this patent is extended or adjusted under 35 U.S.C. 154(b) by 5 days.

(21) Appl. No.: 15/556,415

(22) PCT Filed: Feb. 25, 2016

(86) PCT No.: PCT/JP2016/001021
§ 371 (c)(1),
(2) Date: Sep. 7, 2017

(87) PCT Pub. No.: WO2016/157708
PCT Pub. Date: Oct. 6, 2016

(65) Prior Publication Data
US 2018/0106473 A1    Apr. 19, 2018

Related U.S. Application Data

(63) Continuation of application No. PCT/JP2016/001021, filed on Feb. 25, 2016.

(30) Foreign Application Priority Data

Mar. 27, 2015    (JP) .................. 2015-065398

(51) Int. Cl.
*E04B 1/24*    (2006.01)
*F22B 37/24*    (2006.01)
(Continued)

(52) U.S. Cl.
CPC .............. *F22B 37/24* (2013.01); *E04B 1/985* (2013.01); *E04G 23/02* (2013.01); *E04H 9/024* (2013.01);
(Continued)

(58) Field of Classification Search
CPC . F22B 37/24; E04B 1/985; E04H 9/02; E04H 9/024; F16F 15/02; F16F 15/04
See application file for complete search history.

(56) References Cited

U.S. PATENT DOCUMENTS 3,906,689 A * 9/1975 Nakayama .............. E04H 9/021
                                                                  267/136
6,042,094 A * 3/2000 Lee ......................... E04H 9/021
                                                                  267/150
(Continued)

FOREIGN PATENT DOCUMENTS

JP    57-127075 A    8/1982
JP    02245540 A * 10/1990
(Continued)

OTHER PUBLICATIONS

Notification of Transmittal of Translation of the International Preliminary Report on Patentability (Form PCT/IB/338) issued in counterpart International Application No. PCT/JP2016/001021 dated Oct. 12, 2017, with Forms PCT/IB/373 and PCT/ISA/237. (6 pages).

*Primary Examiner* — Ryan D Kwiecinski
*Assistant Examiner* — Matthew J Gitlin
(74) *Attorney, Agent, or Firm* — Westerman, Hattori, Daniels & Adrian, LLP

(57) ABSTRACT

A structure for seismic isolation 10 provided on a structure plane 17 including a pair of left and right columns 5, 5

(Continued)

spaced apart in a horizontal direction, and a pair of upper and lower beams 7A, 7B spaced apart in a vertical direction, wherein the structure for seismic isolation comprises: a seismic isolation device 11 provided in a middle of each of the column 5, 5 to be displaced toward the beam 7A; and a horizontal rigid bearing element that is provided between an area in which the seismic isolation device 11 is provided and the beam 7B and that includes a connection beam 13 connecting the pair of columns 5, 5 and vertical braces 15L, 15R.

4 Claims, 7 Drawing Sheets

(51) Int. Cl.
*E04G 23/02* (2006.01)
*E04B 1/98* (2006.01)
*E04H 9/02* (2006.01)
*F16F 15/08* (2006.01)
*F16F 1/40* (2006.01)

(52) U.S. Cl.
CPC ...... *E04H 9/027* (2013.01); *E04B 2001/2442* (2013.01); *E04B 2001/2463* (2013.01); *E04B 2001/2487* (2013.01); *F16F 1/40* (2013.01); *F16F 15/08* (2013.01)

(56) References Cited

U.S. PATENT DOCUMENTS

| | | | | |
|---|---|---|---|---|
| 6,119,413 | A * | 9/2000 | Shaw | E04H 9/02 52/167.1 |
| 6,354,047 | B1 * | 3/2002 | Shimoda | E01D 19/02 52/167.1 |
| 9,903,433 | B2 * | 2/2018 | Sato | F16F 1/40 |
| 2002/0162285 | A1 * | 11/2002 | Sahai | E04H 9/02 52/167.7 |
| 2004/0016185 | A1 * | 1/2004 | Wulfert | E04B 2/88 52/167.3 |
| 2006/0037257 | A1 * | 2/2006 | Newland | E04H 9/02 52/167.3 |
| 2006/0080907 | A1 * | 4/2006 | Hulls | E04H 9/02 52/167.1 |
| 2008/0028723 | A1 * | 2/2008 | Nakamitsu | F22B 37/24 52/745.05 |
| 2011/0030305 | A1 * | 2/2011 | Karns | E04B 1/2403 52/650.1 |
| 2014/0053494 | A1 * | 2/2014 | Russell | E04C 3/08 52/660 |
| 2014/0090315 | A1 * | 4/2014 | Imai | E04B 1/49 52/167.1 |
| 2016/0146283 | A1 * | 5/2016 | Sato | F16F 15/04 267/141.1 |
| 2016/0208478 | A1 * | 7/2016 | Matteson | E04C 3/32 |
| 2017/0107734 | A1 * | 4/2017 | Gray | E04H 9/021 |

FOREIGN PATENT DOCUMENTS

| | | | |
|---|---|---|---|
| JP | 9-273314 | A | 10/1997 |
| JP | 10-8738 | A | 1/1998 |
| JP | 2001193290 | A * | 7/2001 |
| JP | 2002-161648 | A | 6/2002 |
| JP | 2007-63941 | A | 3/2007 |
| JP | 2008127791 | A * | 6/2008 |
| JP | 2008-274622 | A | 11/2008 |
| JP | 2009121050 | A * | 6/2009 |
| JP | 2014-20097 | A | 2/2014 |

* cited by examiner

STRUCTURE FOR SEISMIC ISOLATION, STEEL SUPPORT STRUCTURE, AND METHOD FOR SEISMIC ISOLATION OF EXISTING STEEL SUPPORT STRUCTURES

TECHNICAL FIELD

The present invention relates to a structure for seismic isolation suitable for application to existing steel support structures.

BACKGROUND ART

As effective anti-seismic measures for existing structures in general buildings, a seismic isolation retrofit method is widely used, in which an existing structure itself is seismically isolated or seismic isolation is achieved in an intermediate layer of the existing structure.

On the other hand, existing plant support structures are built putting their functions first, and it is difficult to apply the seismic isolation retrofit method for the following reasons.

Seismic isolation retrofit on a foundation requires large-scale construction on the foundation, which increases a suspension period of plant functions. Also, plant functions provided on a foundation such as an underground pit or piping may be damaged.

For seismic isolation retrofit in the intermediate layer, a floor height of one floor is as high as 10 m, which is higher than general buildings. For this reason, as shown in FIGS. 7A and 7B, if a seismic isolation device 111 is provided in an intermediate position of a column 105 between beams 107,107, the distances above and below the seismic isolation device 111 are longer than the device, which prevents bending rigidity in a horizontal direction (hereinafter referred to as horizontal rigidity) of a seismic isolation layer from being ensured. The plant support structure is typically a brace structure rather than a rigid-framed structure, and removing a brace prevents rigidity and strength of the seismic isolation layer from being ensured.

For example, Patent Literatures 1 to 3 make proposals on seismic isolation, which consider general buildings having a rigid-framed structure and are difficult to be applied to an existing plant support steel frame.

Specifically, Patent Literature 1 proposes to place concrete around a column of an existing structure except only an area in which a seismic isolation device is installed, and then cut the area of the existing column in which the seismic isolation device is installed, thereby providing the seismic isolation device. However, applying this to a plant support structure increases a length of a cast-in-place RC column part, which prevents rigidity of a seismic isolation layer from being ensured. Also, cast-in-place concrete needs to be placed over a height substantially corresponding to one floor on an outer periphery of the existing column, which requires labor and increases a suspension period of a plant.

Patent Literature 2 provides seismic isolation in an intermediate layer by securing bearing portions (3) to upper and lower outer peripheries of an area of a column of an existing structure into which a seismic isolation device is inserted and providing the seismic isolation device between the bearing portions. However, applying this to a plant support structure prevents horizontal rigidity of a seismic isolation layer from being ensured due to low bending rigidity of an existing column (1).

Patent Literature 3 proposes providing a viscous damper (8) that functions following displacement generated in a seismic isolation device in an earthquake, in a seismic isolation layer having a structure for seismic isolation provided in an intermediate layer, wherein a reaction in a lateral direction generated in the viscoelastic damper (8) in an earthquake is borne by a vertical reaction portion (6) and a lateral reaction portion (7) provided in the seismic isolation layer. In Patent Literature 3, only the reaction of the viscous damper (8) is borne by a compression force and a tensile force of the lateral reaction portion (7), and the lateral reaction portion (7) is low in strength, which makes it difficult to ensure horizontal rigidity of the seismic isolation layer.

CITATION LIST

Patent Literature

Patent Literature 1: JP9-273314A (FIG. 2)
Patent Literature 2: JP10-3738A (FIG. 3)
Patent Literature 3: JP2008-274622A (FIG. 4)

SUMMARY OF INVENTION

Technical Problem

The present invention is achieved in view of such technical problems, and has an object to provide a structure for seismic isolation capable of ensuring horizontal rigidity of areas above and below a seismic isolation device and obtaining stable seismic isolation behavior in seismic isolation of an existing plant support structure having a high floor height.

Solution to Problem

The present invention provides a structure for seismic isolation provided on a structure plane including a pair of left and right columns spaced apart in a horizontal direction, and at least one beam bridging between the pair of columns, wherein the structure for seismic isolation comprises: a seismic isolation device provided in a middle of each of the columns and displaced toward the beam; and a horizontal rigid bearing element that is provided on an opposite side of an area in which the seismic isolation device is provided from the beam and that includes a connection beam connecting the pair of columns.

According to the structure for seismic isolation of the present invention, the seismic isolation device is provided to be displaced toward the beam, thereby increasing bending rigidity of am area of the column between the seismic isolation device and the beam. Also, the horizontal rigid bearing element including the connection beam is provided on the opposite side of the area in which the seismic isolation device is provided from the beam, thereby ensuring horizontal rigidity of a seismic isolation layer including the structure plane. Thus, a steel support structure to which the present invention is applied obtains stable seismic isolation behavior.

In a case where a plurality of beams are spaced apart in a vertical direction, the structure for seismic isolation of the present invention may be provided below a beam located in a lowermost layer or may be provided between a pair of upper and lower beams. In the latter case, the seismic isolation device is provided to be displaced toward either of the beams, and the horizontal rigid bearing element is provided between the area in which the seismic isolation device is provided and the other of the beams.

The horizontal rigid bearing element in the present invention includes at least two forms.

The first form is such that the element includes a connection beam pin-coupled to a pair of columns, and a vertical brace connected to the connection beam. In the case where the seismic isolation device is provided between the pair of upper and lower beams, the vertical brace is provided between the connection beam and the other of the beams. The second form is such that the element includes a connection beam directly or indirectly rigidly coupled to the pair of columns.

The seismic isolation device in the present invention is preferably provided immediately above or below the beam.

The present invention is intended to be applied to an existing steel support structure, and in this case, the beam is an existing beam and the pair of columns are existing columns.

The structure for seismic isolation of the present invention is described above as being provided on one structure plane. However, this structure may be applied to a steel support structure including an object to be supported, and a support steel frame that has a plurality of columns standing on a foundation via column bases and a plurality of beams connecting adjacent columns and that suspends and supports the object to be supported. In this case, the structure for seismic isolation is provided in an intermediate layer of the support steel frame. Also, the structures for seismic isolation may be continuously provided on a plurality of structure planes arranged in a horizontal direction.

The present invention may apply a method for providing any of the structures for seismic isolation described above in an intermediate layer of an existing steel support structure including an object to be supported, and a support steel frame that has a plurality of columns standing on a foundation via column bases and a plurality of beams connecting adjacent columns and that suspends and support the object to be supported.

This structure for seismic isolation is provided on a structure plane including a pair of left and right columns spaced apart in a horizontal direction, and at least one beam, bridging between the pair of columns.

The method of the present invention includes at least the steps of: connecting a pair of columns using a connection beam; providing a support member between the connection beam and a beam and then cutting an area of the column between the connection beam and the beam; providing a seismic isolation device in the cut area; and removing the support member.

Advantageous Effect of Invention

According to the structure for seismic isolation of the present invention, in seismic isolation of the existing steel support structure, horizontal rigidity of a seismic isolation layer can be ensured, thereby obtaining stable seismic isolation behavior.

BRIEF DESCRIPTION OF DRAWINGS

FIG. 1A shows a configuration thereof and FIG. 1B shows behavior in an earthquake.

FIG. 2A shows a configuration thereof and FIG. 2B shows behavior in an earthquake.

DESCRIPTION OF EMBODIMENTS

Now, with reference to the accompanying drawings, embodiments of the present invention will be described.

This embodiment proposes a structure for seismic isolation and a method for seismic isolation of an existing steel support structure that supports a boiler. Before describing the structure for seismic isolation and the method for seismic isolation, an example configuration of a boiler support structure to which this embodiment is applied will be described.

Figure 4A:
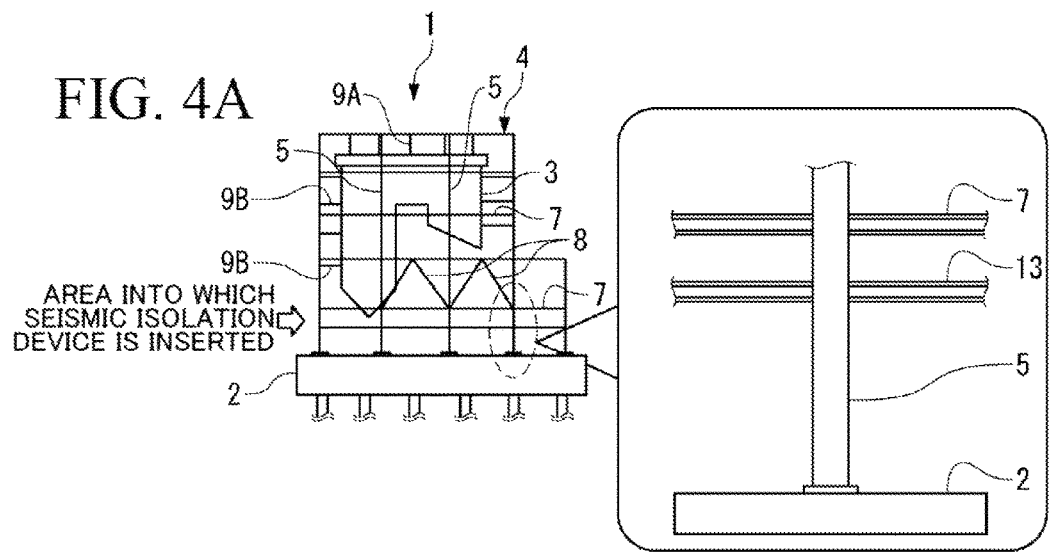
FIGS. 4A and 4B sequentially show steps of seismic isolation of the plant support structure according to a third embodiment.
Figure 4B:
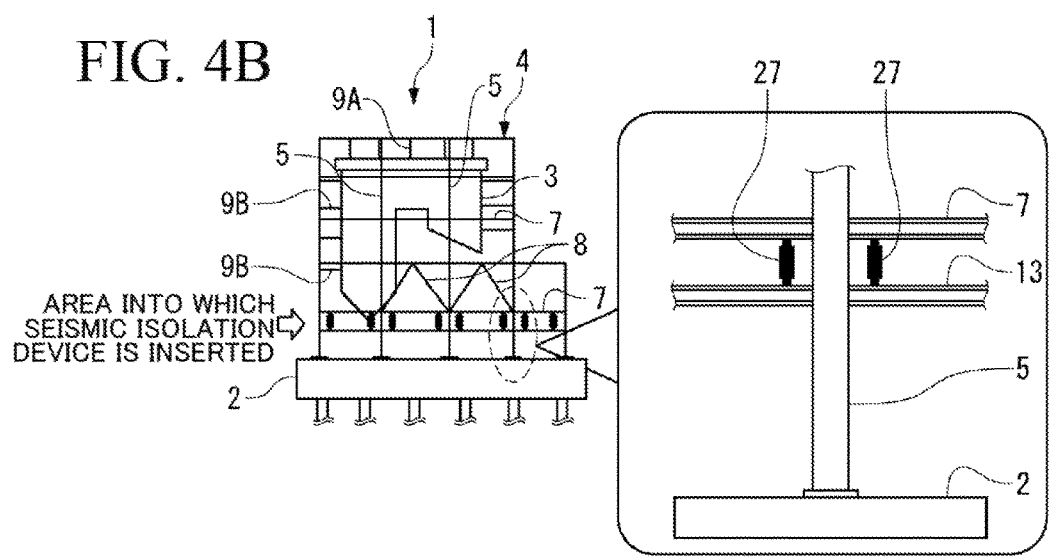
Figure 5A:
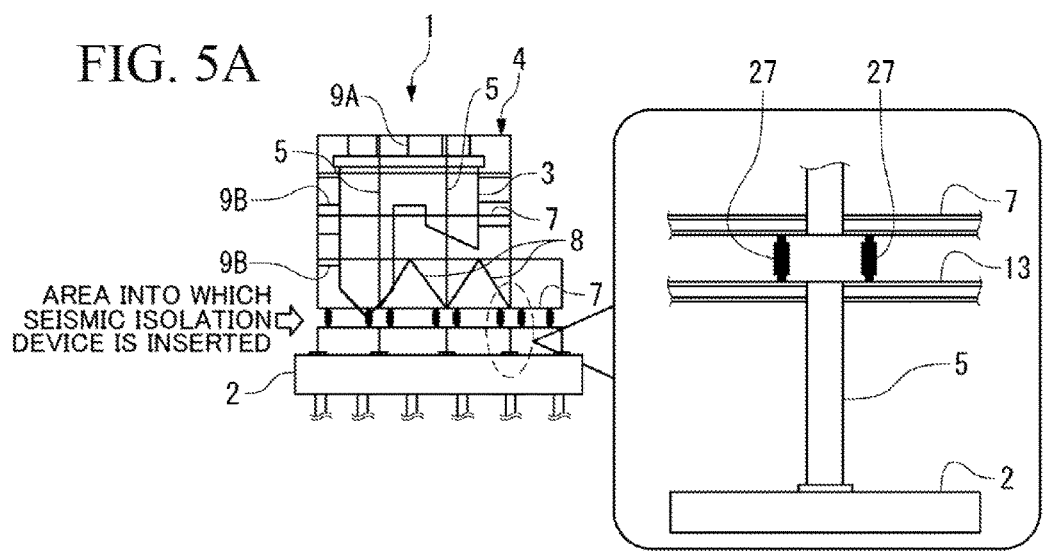
FIGS. 5A and 5B show steps after those in FIGS. 4A and 4B.
Figure 5B:
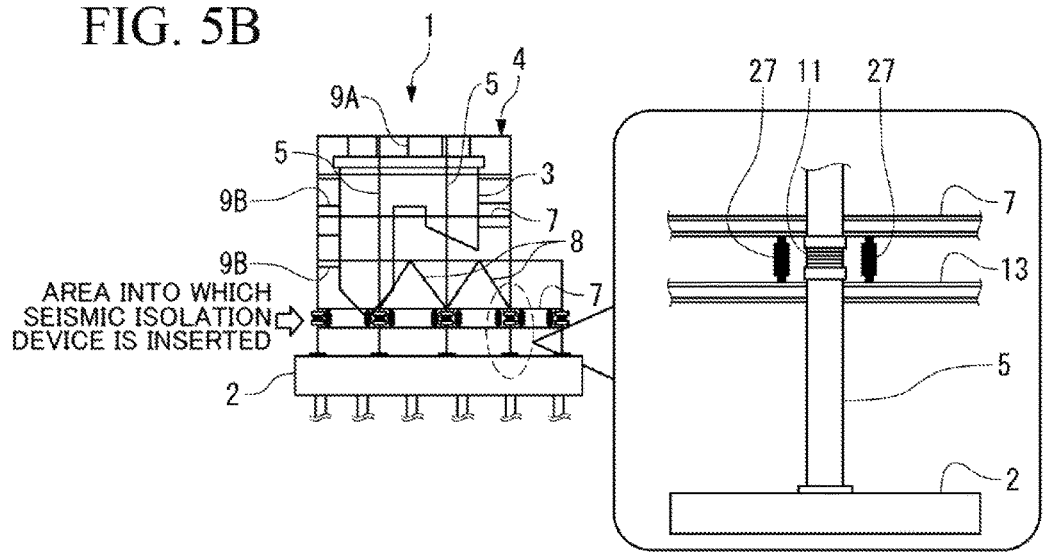
Figure 6:
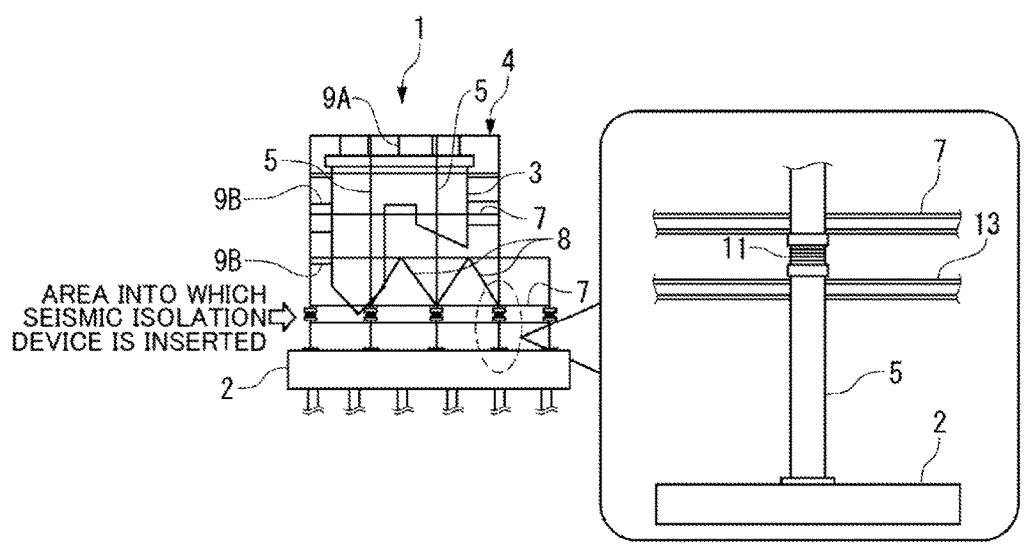
FIG. 6 shows steps after those in FIGS. 5A and 5B.
Figure 7A:
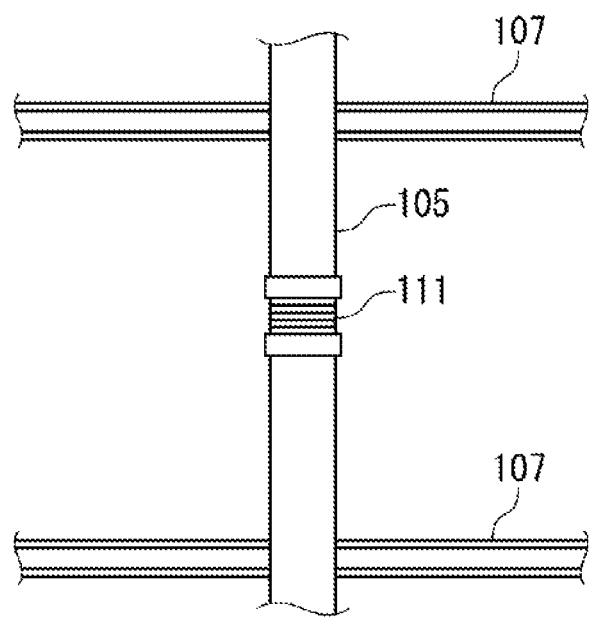
FIGS. 7A and 7B illustrate problems of a conventional plant support structure.
Figure 7B:
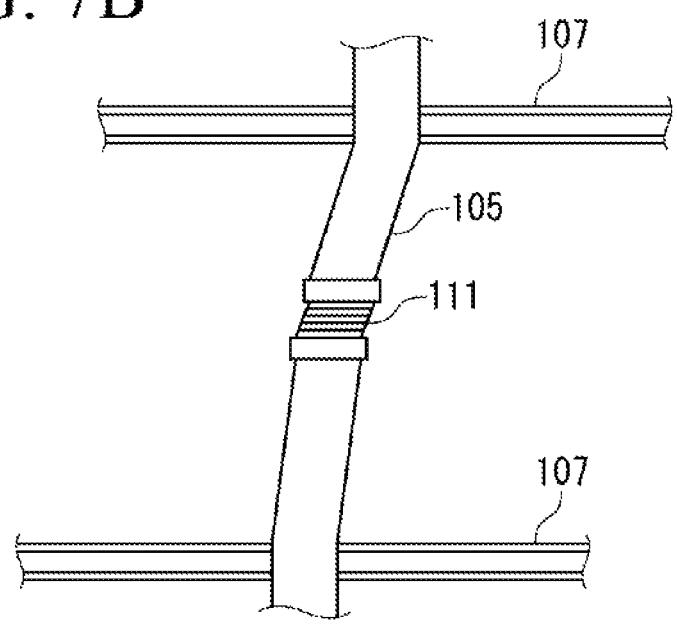

As shown in FIG. 4A, a boiler support structure 1 according to this embodiment is provided on a foundation 2, and mainly includes a boiler body 3, and a support steel frame 4 that supports the boiler body 3.

The support steel frame 4 includes a combination of a plurality of columns 5 extending in a vertical direction, a plurality of beams 7 extending in a horizontal direction, and a plurality of vertical braces 8. The boiler support structure 1 stands on the foundation 2 via column bases as end portions of the columns 5 that constitute the support steel frame 4. The column 5, the beam 7, and the vertical brace 8 refer to an existing column, beam, and vertical brace.

The boiler support structure 1 suspends the boiler body 3 from a top of the support steel frame 4 via a plurality of suspension bars 9A secured to a beam 7 in an uppermost layer so as to prevent restraint of thermal expansion during operation. The boiler support structure 1 includes a support 9B bridging in a horizontal direction between the boiler body 3 and a column 5 located in an outermost periphery of the support steel frame 4 in order to control displacement of the boiler body 3 in the horizontal direction.

Structures for seismic isolation 10, 20 according to this embodiment are applied to an intermediate layer of this support steel frame 4.

Now, in a first embodiment (a structure for seismic isolation 10) and a second embodiment (a structure for seismic isolation 20), preferable examples of a structure for seismic isolation will be described, and then in a third embodiment, a preferable example of a method for seismic isolation will be described.

First Embodiment

Figure 1A:
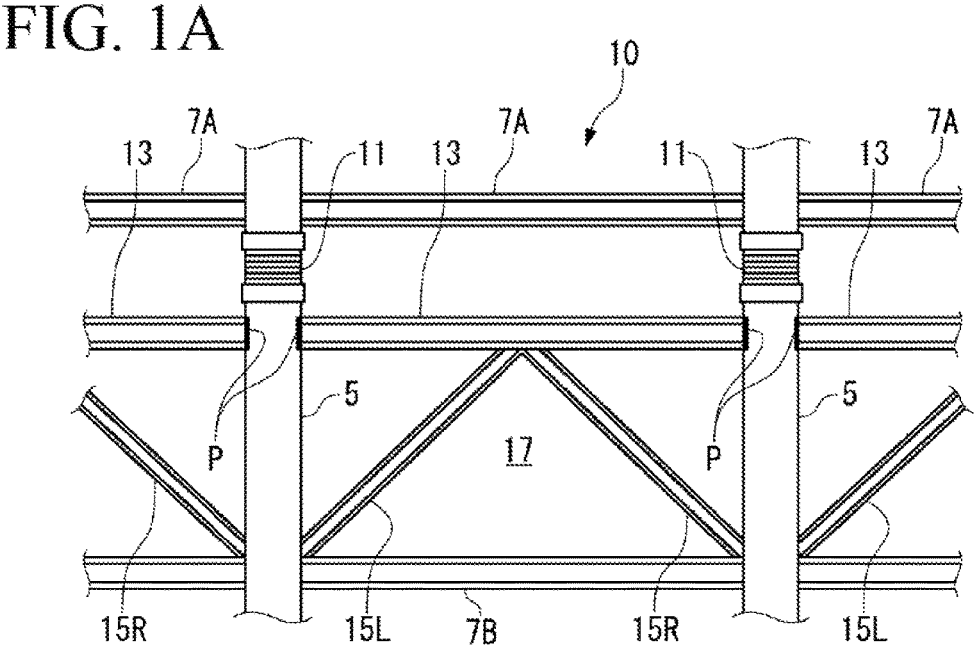
FIGS. 1A and 1B show a plant support structure according to a first embodiment.
Figure 1B:
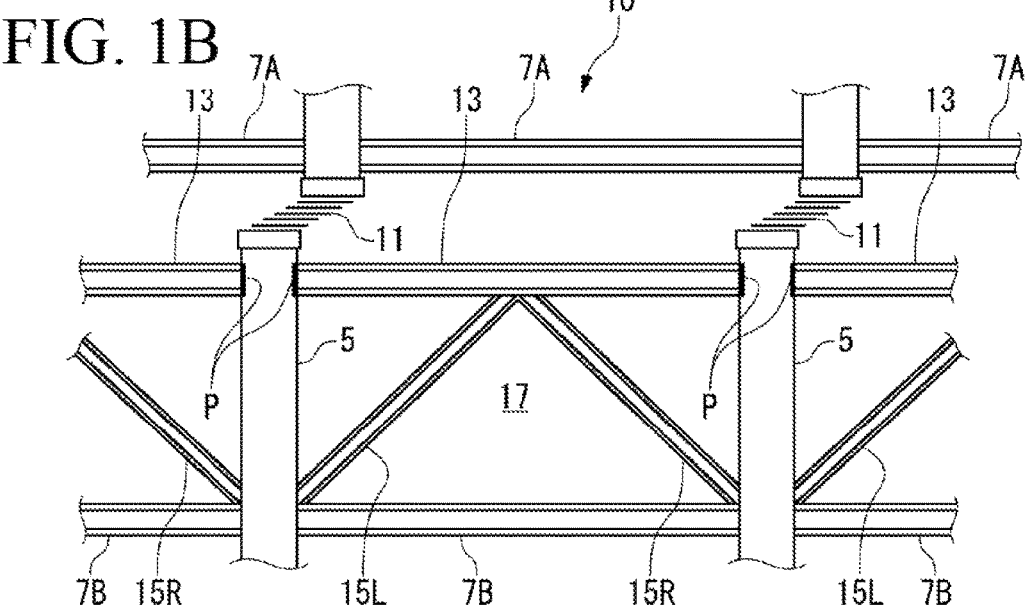

As shown in FIGS. 1A and 1B, a structure for seismic isolation 10 according to a first embodiment is provided on a structure plane 17 including a pair of left and right columns 5, 5 spaced apart in a horizontal direction, and a pair of upper and lower beams 7A, 7B spaced apart in a vertical direction.

The structure for seismic isolation 10 includes a seismic isolation device 11 provided in each of the columns 5, 5, a connection beam 13 connecting the columns 5, 5 in which the seismic isolation device 11 is provided, and a pair of vertical braces 15L, 15R provided between the connection beam 13 and the beam 7B. The connection beam 13 and the vertical braces 15L, 15R constitute a horizontal rigid bearing element in the present invention.

Although the structure for seismic isolation 10 on one structure plane 17 is described here, the structures for seismic isolation 10 may be continuously provided on a plurality of structure planes 17 arranged horizontally to the structure plane 17 described here.

Although an existing vertical brace is provided on the structure plane 17 in FIG. 1A and FIG. 1B, the vertical brace is removed before configuring the structure for seismic isolation 10.

The seismic isolation device 11 is provided in the middle of the column 5. This is provided in a partially cut area of the column 5 which has been in one piece before seismic isolation.

The seismic isolation device 11 is displaced most toward the beam 7A, and provided immediately below the beam 7A. The position in which the seismic isolation device 11 is provided is one of features of this embodiment as described later.

As the seismic isolation device 11, a seismic isolation device of a laminated rubber bearing type, a slide bearing type, a rolling bearing type, or other types may be used.

The connection beam 13 is provided below the seismic isolation device 11 on the opposite side of an area in which the seismic isolation device 11 is provided from the beam 7A. The connection beam 13 is pin-coupled P to the column 5. The pin-coupling P here is a coupling with the column 5 against vertical bending.

The vertical braces 15L, 15R are provided between the connection beam 13 and the existing beam 7B. The pair of vertical braces 15L, 15R are newly provided for seismic isolation and inclined in opposite directions. The vertical braces 15L, 15R are rigidly coupled at one ends to the connection beam 13 and at the other ends to intersections between the columns 5 and the beam 7B. For pin-coupling and rigid coupling, for example, a coupling member such as a gazette plate or a splice is used, but a description thereof is omitted here.

When the boiler support structure 1 including the structure for seismic isolation 10 is loaded in the horizontal direction by earthquake motion, as shown in FIG. 1B, the seismic isolation device 11 provided in the column 5 functions to inhibit direct transmission of earthquake vibration to the support steel frame 4 above the structure for seismic isolation 10.

Since the seismic isolation device 11 is provided immediately below the beam 7A, an area between the seismic isolation device 11 and the beam 7A has high bending rigidity. Also, the connection beam 13 and the vertical braces 15L, 15R are provided below the seismic isolation device 11, thereby ensuring bending rigidity of the column 5.

As described above, providing the structure for seismic isolation 10 ensures rigidity in the horizontal direction of a seismic isolation layer even in the boiler support structure 1 of an existing plant having a high floor height. Thus, the boiler support structure 1 can obtain stable seismic isolation behavior.

The structure for seismic isolation 10 includes the seismic isolation device 11 provided immediately below the beam 7A, and thus elements for bearing the horizontal rigidity, that is, the connection beam 13 and the vertical braces 15L, 15R may be simply provided between the seismic isolation device 11 and the beam 7B. For example, the seismic isolation device 11 may be provided in a middle between the beam 7A and the beam 7B, and a structure for ensuring horizontal rigidity including the connection beam 13 and the vertical braces 15L, 15R may be provided between the seismic isolation device 11 and the beam 7A and between the seismic isolation device 11 and the beam 7B. However, in this case, two sets of the elements need to be provided, thereby increasing material cost and load for installation work. Thus, the structure for seismic isolation 10 according to this embodiment can reduce cost and load for installation work for ensuring predetermined horizontal rigidity.

Although the structure for seismic isolation 10 including the seismic isolation device 11 provided immediately below the beam 7A is shown as an example, the seismic isolation device 11 may be provided immediately above the beam 7B, the connection beam 13 may be provided thereabove, and the vertical braces 15L, 15R may be further provided between the connection beam 13 and the beam 7A. This form has high rigidity against bending of an area of the column 5 between the seismic isolation device 11 and the beam 7B, and the connection beam 13 and the vertical braces 15L, 15R are provided above the seismic isolation device 11, thereby ensuring bending rigidity of the column 5.

A floor is typically provided in a position in which the beam 7 (beam 7A, beam 7B) is provided. Thus, the seismic isolation device 11 is provided below an upper floor and above a lower floor adjacent to each other in the vertical direction. For example, if the structure for seismic isolation is provided between a second floor (2FL) and a third floor (3FL), the seismic isolation device 11 is preferably provided immediately below 3FL or immediately above 2FL.

The seismic isolation device 11 is provided here immediately below the beam 7A or immediately above the beam 7B, which is an example of the seismic isolation device 11 being displaced most toward the beam 7A or the beam 7B as a beam on one side. However, since the coupling member is located in a coupling portion between the column 5 and the beam 7, the seismic isolation device 11 is actually provided immediately below or immediately above an area with the coupling member. Also, there is no need to provide the seismic isolation device 11 immediately below or immediately above the beam 7 as long as horizontal rigidity of an area of the column 5 above the seismic isolation device 11 or horizontal rigidity of an area of the column 5 below the seismic isolation device 11 can be ensured.

In other words, the present invention covers any configurations according to the gist of the present invention in which displacing the seismic isolation device 11 toward the beam 7A or the beam 7B can increase bending rigidity of the area between the seismic isolation device 11 and the beam 7A or between the seismic isolation device 11 and the beam 7B, while the horizontal rigid bearing element may be provided only above or below the seismic isolation device 11. As one guideline, with a span between the beam 7A and the beam 7B being L, the seismic isolation device 11 may be provided within a range of ¼L from the beam 7A or a range of ¼L from the beam 7B.

In this embodiment, the connection beam 13 and the vertical braces 15L, 15R pin-coupled P are used as the horizontal rigid bearing element. In this case, a horizontal force is transmitted by an axial force of the vertical braces 15L, 15R, resulting in such an effect that a combination of relatively small members can ensure predetermined horizontal rigidity and horizontal strength.

Second Embodiment

Figure 2A:
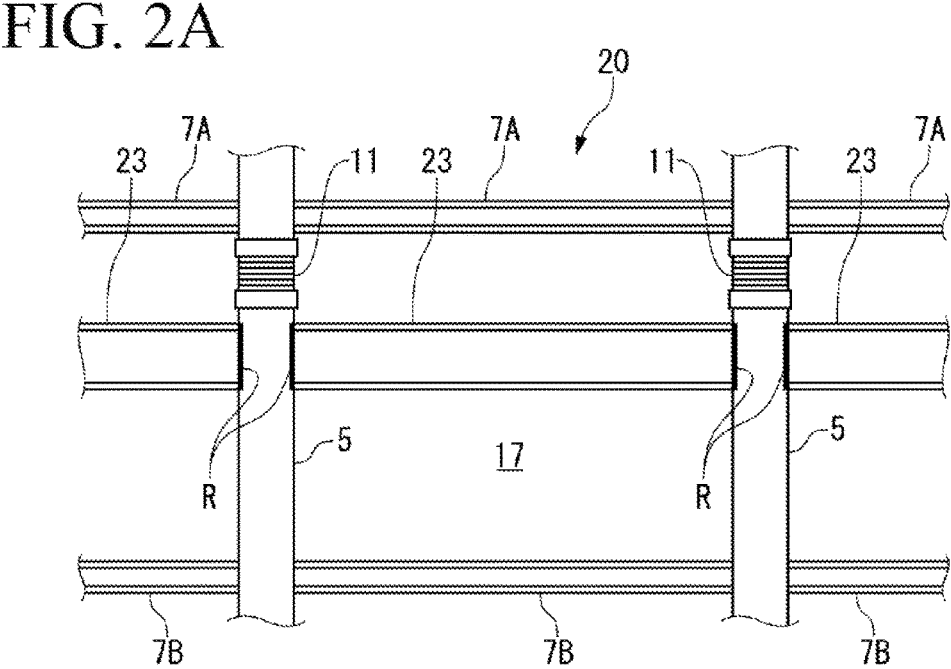
FIGS. 2A and 2B show a plant support structure according to a second embodiment.
Figure 2B:
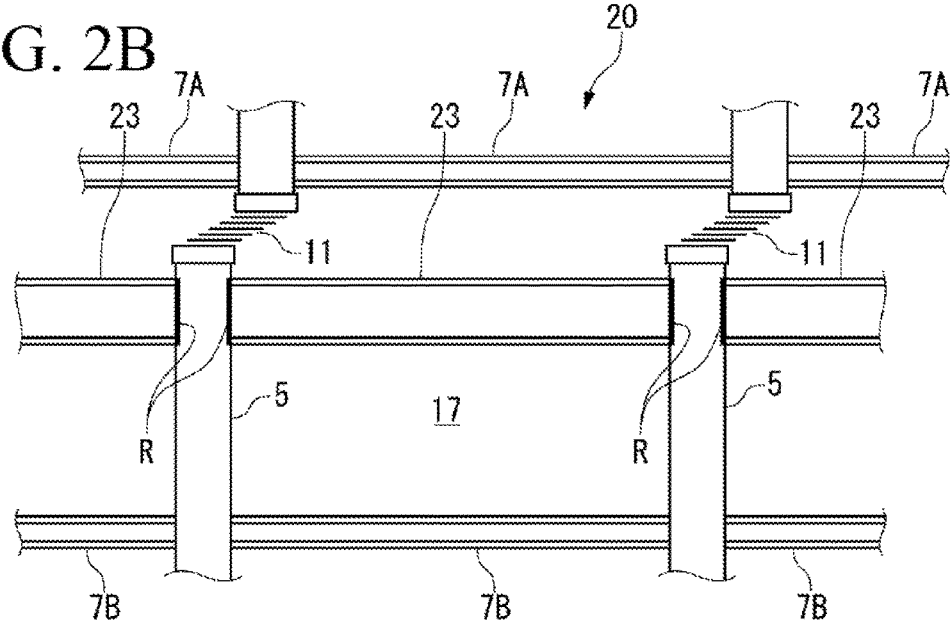

Next, as shown in FIGS. 2A and 2B, a structure for seismic isolation 20 according to a second embodiment uses a structure in which a connection beam 23 is rigidly coupled R to columns 5 against vertical bending and the vertical braces 15L, 15R provided in the structure for seismic isolation 10 are not provided.

In the structure for seismic isolation 20 above, the added connection beam 23 and the columns 5, 5 form a rigid-frame structure, thereby ensuring horizontal rigidity and horizontal strength of a seismic isolation layer even without the vertical braces 15L, 15R provided in the first embodiment.

Figure 3:
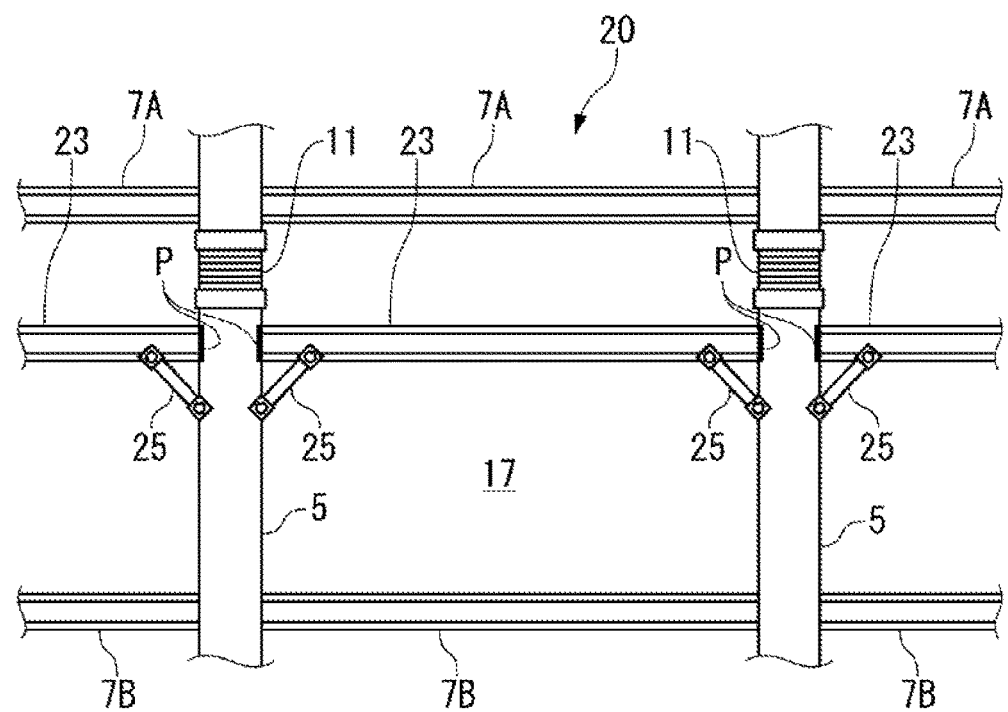
FIG. 3 shows a variation of the second embodiment.

As shown in FIG. 3, instead of the connection beam 23 and the column 5 being directly rigidly coupled, the connection beam 23 and the column 5 may be pin-coupled, while a stiffener 25 may be added so that the connection beam 23 and the column 5 are indirectly rigidly coupled R as a whole.

Third Embodiment

Next, with reference to FIGS. 4A to 6, steps for obtaining the structure for seismic isolation 10 will be described. Unlike the first and second embodiments, an example is shown here in which a connection beam 13 as a horizontal rigid bearing element is provided only below a beam 7 located in a lowermost layer among a plurality of beams 7 provided in a vertical direction.
<Step 1 (FIG. 4A)>

First, as shown in FIG. 4A, a vertical brace 8 at a floor height where a seismic isolation device 11 is provided is removed, and then a connection beam 13 is provided below an area into which the seismic isolation device 11 is inserted. Vertical braces 15L, 15R and a stiffener 25 are provided between the connection beam 13 and the existing beam 7B in this step if provided.

If the seismic isolation device 11 is provided above the existing beam 7B shown in FIGS. 1A and 1B, the connection beam 13 is provided above a position into which the seismic isolation device 11 is inserted.
<Step 2 (FIG. 4B)>

Between the existing beam 7 and the connection beam 13 provided in step 1, a support member 27, for example, a hydraulic jack removable afterward is provided. The support member 27 supports between the beam 7 and the connection beam 13.
<Step 3 (FIG. 5A)>

With the support member 27 supporting an axial force of the column 5, an area of the column 5 into which the seismic isolation device 11 is inserted is cut. If the support, member 27 is a hydraulic jack, for example, the hydraulic jack may be elevated to cause the axial force of the column 5 to act, on the hydraulic jack as the support member 27.
<Step 4 (FIG. 5B)>

The seismic isolation device 11 is inserted into the area cut in step 3, and a lower end of the cut column 5 and an upper surface of the seismic isolation device 11 are joined, and an upper end of the cut column 5 and a lower surface of the seismic isolation device 11 are joined.
<Step 5 (FIG. 6)>

After the seismic isolation device 11 is inserted, the support member 27 is removed, the axial force of the column 5 is supported by the seismic isolation device 11 thereby completing installation of the structure for seismic isolation 10.

The method described above does not require placing of concrete, and thus the structure for seismic isolation 10 can be easily installed in a shorter time as compared to a conventional method (Patent Literature 1). Also, the seismic isolation increases less weight than by the conventional method, thereby preventing an increase in regular load and earthquake load acting on the column 5 and the beam 7 due to the increase in weight.

Also, if the connection beam 13 is not provided in the method described above, a load of the support member 27 is transmitted to the beam 7 on a lower side (or onto the foundation 2), and in this case, the support member 27 has a long length corresponding to one floor. Then, if the axial force of the column 5 acts on the support member 27, the support member 27 may buckle. However, providing the connection beam 13 allows the support member 27 to have a length substantially corresponding to a space between the existing beam 7 and the connection beam 13, which eliminates the possibility of buckling of the support member 27. As such, the connection beam 13 has its own advantage in a process of installation of the structure for seismic isolation 10.

The preferred embodiments of the present invention have been described above, but the configurations in the embodiments may be chosen or changed to other configurations without departing from the gist of the present invention.

For example, in the first embodiment, the pair of vertical braces 15L, 15R are provided on one structure plane 17, but the present invention is not limited to this. For example, only one vertical brace may be provided on one structure plane 17 and vertical braces provided on adjacent structure planes 17, 17 may be inclined in opposite directions.

In the present invention, the structures for seismic isolation 10 are most preferably provided on all the structure planes 17 arranged in the horizontal direction, but the structure for seismic isolation 10 may not be provided on part of the structure planes.

REFERENCE SIGNS LIST

1 boiler support structure
2 foundation
3 boiler body
4 support steel frame
5 column
7, 7A, 7B beam
8 vertical brace
9A suspension bar
9B support
10, 20 structure for seismic isolation
11 seismic isolation device
13, 23 connection beam
15L, 15R vertical brace
25 stiffener
27 support member

The invention claimed is:

1. A method for providing a structure for seismic isolation in an intermediate layer of an existing steel support structure including an object to be supported, and a support steel frame that has a plurality of columns standing on a foundation via column bases and a plurality of beams connecting adjacent columns and that suspends and supports the object to be supported, the structure for seismic isolation being provided on a structure plane including a pair of left and right columns spaced apart in a horizontal direction, and at least one beam bridging between the pair of columns,
   wherein the structure for seismic isolation comprises:
      a seismic isolation device provided in a middle of each of the columns and displaced closer to a first beam of the at least one beam; and
      a horizontal tie beam connecting the pair of columns, wherein, the method comprises at least the steps of:

connecting the pair of columns using the horizontal tie beam;

providing a support member between the horizontal tie beam and the first beam and then cutting an area of at least one of the columns between the horizontal tie beam and the first beam;

providing the seismic isolation device in the cut area; and removing the support member.

2. The method for seismic isolation of an existing steel support structure according to claim 1, wherein the object to be supported is a boiler.

3. A method for providing a structure for seismic isolation in an intermediate layer of an existing steel support structure including an object to be supported, and a support steel frame that has a plurality of columns standing on a foundation via column bases and a plurality of beams connecting adjacent columns and that suspends and supports the object to be supported, the structure for seismic isolation being provided on a structure plane including a pair of left and right columns spaced apart in a horizontal direction, and a pair of upper and lower beams spaced apart in a vertical direction, each of the upper and lower beams bridging between the pair of columns, wherein the structure for seismic isolation comprises:

a seismic isolation device provided in a middle of each of the columns; and a horizontal tie beam connecting the pair of columns, wherein the seismic isolation device is provided to be displaced closer to one of the upper and lower beams, and the horizontal tie beam is provided between the area in which the seismic isolation device is provided and the other of the upper and lower beams, wherein the structure for seismic isolation is provided on the structure plane including the pair of left and right columns and the upper and lower beams, the method comprises at least the steps of:

connecting the pair of columns using the horizontal tie beam;

providing a support member between the horizontal tie beam and one of the upper and lower beams and then cutting an area of at least one of the pair of left and right columns between the horizontal tie beam and the one of the upper and lower beams;

providing the seismic isolation device in the cut area; and removing the support member.

4. The method for seismic isolation of an existing steel support structure according to claim 3, wherein the object to be supported is a boiler.

* * * * *